(12) United States Patent
Hayashi

(10) Patent No.: US 11,459,985 B2
(45) Date of Patent: Oct. 4, 2022

(54) PUMP GEAR

(71) Applicant: ISUZU MOTORS LIMITED, Tokyo (JP)

(72) Inventor: Kengo Hayashi, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 64 days.

(21) Appl. No.: 17/274,098

(22) PCT Filed: Sep. 5, 2019

(86) PCT No.: PCT/JP2019/034925
§ 371 (c)(1),
(2) Date: Mar. 5, 2021

(87) PCT Pub. No.: WO2020/050353
PCT Pub. Date: Mar. 12, 2020

(65) Prior Publication Data
US 2021/0332778 A1 Oct. 28, 2021

(30) Foreign Application Priority Data
Sep. 7, 2018 (JP) .............................. JP2018-167882

(51) Int. Cl.
*F02M 37/06* (2006.01)
*F02M 59/44* (2006.01)
*F16H 57/00* (2012.01)

(52) U.S. Cl.
CPC ............ *F02M 37/06* (2013.01); *F02M 59/44* (2013.01); *F16H 57/0006* (2013.01)

(58) Field of Classification Search
CPC ..... F02M 59/44; F02M 37/06; F16H 57/0006
See application file for complete search history.

(56) References Cited

U.S. PATENT DOCUMENTS

| | | | | |
|---|---|---|---|---|
| 2,742,547 A | * | 4/1956 | Tsai | H01H 37/52 337/336 |
| 4,190,401 A | * | 2/1980 | Hofmann | F02M 59/44 403/14 |

(Continued)

FOREIGN PATENT DOCUMENTS

| | | |
|---|---|---|
| JP | S59-091405 U | 6/1984 |
| JP | H06-288319 A | 10/1994 |

(Continued)

OTHER PUBLICATIONS

International Search Report and Written Opinion for related PCT App No. PCT/JP2019/034925 dated Nov. 19, 2019, 8 pgs. (partial translation).

*Primary Examiner* — Kevin A Lathers
(74) *Attorney, Agent, or Firm* — Procopio, Cory, Hargreaves & Savitch LLP

(57) ABSTRACT

The pump gear to be mounted on an input shaft 3 of a supply pump 2 that pumps fuel has a hollow portion 8 that is open to a distal end side in an axial C direction and a tapered surface 9 that is formed on an inner peripheral surface of the hollow portion and gradually increases in diameter as it extends from a base end side toward the distal end side in the axial direction. The tapered surface is configured such that a focusing point F1 of sound radiation S1 radiating perpendicularly from a distal end portion in the axial direction 15 of the tapered surface is positioned at a distal endmost position P4 in the axial direction of the hollow portion or at a position closer to the base end side in the axial direction than the distal endmost position in the axial direction.

4 Claims, 2 Drawing Sheets

(56) References Cited

U.S. PATENT DOCUMENTS

| | | | | |
|---|---|---|---|---|
| 4,322,174 A | * | 3/1982 | Ishii | F02M 59/48 403/14 |
| 2015/0059702 A1 | * | 3/2015 | Suzuki | F02M 39/00 123/456 |

FOREIGN PATENT DOCUMENTS

| | | |
|---|---|---|
| JP | H11-062759 A | 3/1999 |
| JP | H11-336632 A | 12/1999 |
| JP | 2002-326133 A | 11/2002 |
| JP | 2005-002895 A | 1/2005 |
| WO | 2013/105419 A1 | 7/2013 |

\* cited by examiner

PUMP GEAR

CROSS-REFERENCE TO RELATED APPLICATIONS

This application is a U.S. National Stage entry of PCT Application No: PCT/JP2019/034925 filed Sep. 5, 2019, which claims priority to Japanese Patent Application No. 2018-167882 filed Sep. 7, 2018, the contents of which are incorporated herein by reference.

TECHNICAL FIELD

The present disclosure relates to a pump gear, and in particular, to a pump gear configured to be mounted on an input shaft of a supply pump that pumps fuel.

BACKGROUND ART

In a diesel engine equipped with a common rail fuel injection device, fuel in a fuel tank is sent to a supply pump by a feed pump, pressurized to high pressure by the supply pump, and pumped and supplied to a common rail. A pump gear is mounted on an input shaft of the supply pump, and the pump gear is rotationally driven by a crankshaft of the engine via a gear train to drive the supply pump.

CITATION LIST

Patent Literature

PTL 1: Japanese Utility Model Application Laid-Open Publication No. 59-91405

SUMMARY OF INVENTION

Technical Problem

Meanwhile, some pump gears include a hollow portion that is open to a distal end side in an axial direction, and a tapered surface that is formed on an inner peripheral surface of the hollow portion and gradually increases in diameter as it extends from a base end side toward the distal end side in the axial direction. In this case, vibration during driving transmitted from the teeth on an outer peripheral portion of the pump gear is transmitted to the inner peripheral surface of the hollow portion through the flesh of the pump gear and is radiated from the inner peripheral surface of the hollow portion.

At this time, a focusing point of the sound radiation radiated from the inner peripheral surface of the hollow portion is located at the distal end side in the axial direction that is farther than a distal endmost position in the axial direction of the hollow portion, which causes an increased noise when driving the pump gear.

Therefore, the present disclosure was devised in view of such circumstances, and an object of the present disclosure is to provide a pump gear capable of reducing noise during driving of the pump gear.

Solution to Problem

According to one aspect of the present disclosure,
provided is a pump gear configured to be mounted on an input shaft of a supply pump that pumps fuel, which includes
a hollow portion that is open to a distal end side in an axial direction, and
a tapered surface that is formed on an inner peripheral surface of the hollow portion and gradually increases in diameter as it extends from a base end side toward the distal end side in the axial direction,
in which
the tapered surface is configured such that a focusing point of sound radiation radiating perpendicularly from a distal end portion in the axial direction of the tapered surface is positioned at a distal endmost position in the axial direction of the hollow portion or at a position closer to the base end side in the axial direction than the distal endmost position in the axial direction.

Preferably, the pump gear includes
a cylindrical surface formed on the inner peripheral surface of the hollow portion, adjacent to the distal end side of the tapered surface in the axial direction, and formed parallel to the axial direction.

Preferably, the pump gear further includes
a tooth portion formed on an outer peripheral portion of the distal end portion in the axial direction, in which
the distal end portion in the axial direction of the tapered surface is located radially inside in an axial length range of the tooth portion.

Advantageous Effects of Invention

According to the present disclosure, it is possible to reduce noise when driving a pump gear.

DESCRIPTION OF EMBODIMENTS

Hereinafter, an embodiment of the present disclosure will be described with reference to the drawings. Note that the present disclosure is not limited to the following embodiment.

Figure 1:
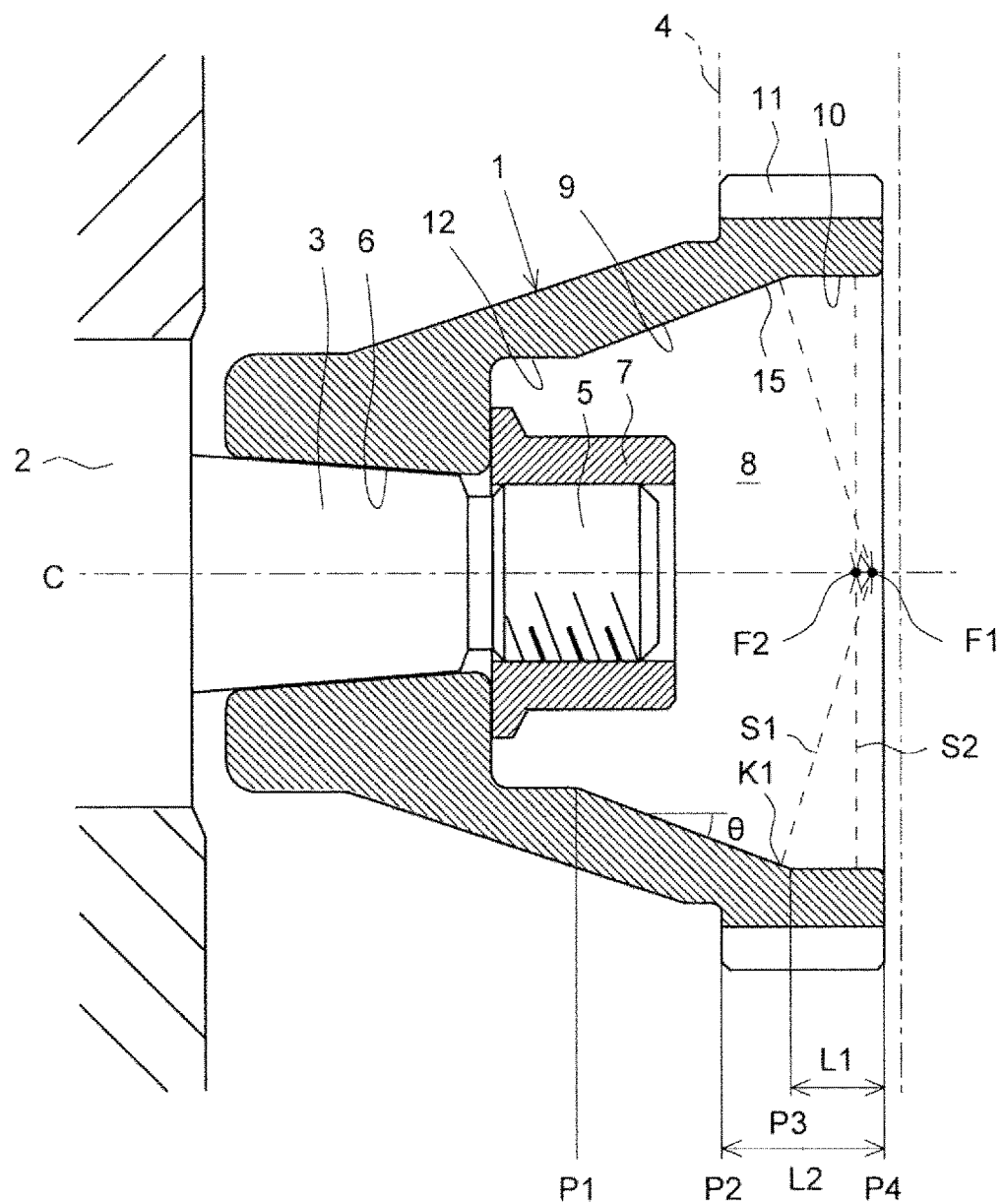
FIG. 1 is a schematic longitudinal sectional view showing a pump gear according to an embodiment.

FIG. 1 is a schematic longitudinal sectional view showing a pump gear according to an embodiment of the present disclosure. The pump gear 1 according to the present embodiment is applied to a diesel engine provided with a common rail fuel injection device. In this engine, the fuel in the fuel tank (not shown) is sent to a supply pump 2 by a feed pump (not shown), pressurized to a high pressure by the supply pump 2, and pumped to a common rail (not shown). The pump gear 1 is mounted on an input shaft 3 of the supply pump 2, and the pump gear 1 is rotationally driven by a crankshaft (not shown) of the engine via a uear train to drive the supply pump 2. Regarding the gear train, only one gear 4 meshed with the pump gear 1 is shown by a virtual line.

The pump gear 1 is coaxially mounted on the input shaft 3. C indicates a central axis (referred to as a gear axis) of the pump gear 1. Hereinafter, unless otherwise stated, an axial direction, a radial direction, and a circumferential direction refer to an axial direction, a radial direction, and a circumferential direction with respect to a gear axis C. The right-hand side in the drawing is a distal end side in the axial direction, and the left-hand side in the drawing is a base end side in the axial direction.

The pump gear 1 generally has an axially symmetrical shape, approximately such as a bowl or a porcelain cup. The pump gear 1 is fitted around and mounted on the outside of the input shaft 3. The input shaft 3 is a tapered shaft whose diameter is gradually decreased from the base end side toward the distal end side in the axial direction, and has a male screw portion 5 integrally at a distal end portion thereof. A tapered mounting hole 6 formed in the base end portion of the pump gear 1 is fitted with the input shaft 3. The pump gear 1 is fixed to the input shaft 3 by tightening a nut 7 to the male screw portion 5 from the distal end side.

The pump gear 1 includes a hollow portion 8 that is open to a distal end side in the axial direction, and a tapered surface 9 that is formed on an inner peripheral surface of the hollow portion 8 and gradually increases in diameter as it extends from the base end side toward the distal end side in the axial direction. In addition, the pump gear 1 further includes a cylindrical surface 10 formed on the inner peripheral surface of the hollow portion 8. The cylindrical surface 10 is adjacent to the distal end side of the tapered surface 9 in the axial direction and is formed parallel to the axial direction. Further, the pump gear 1 includes a tooth portion 11 formed on an outer peripheral portion of the distal end portion in the axial direction.

The base end side of the hollow portion 8 in the axial direction is closed except for the mounting hole 6 part. The tapered surface 9 has a predetermined inclination angle θ with respect to the gear axis C direction. The tapered surface 9 extends axially from a base endmost position P1 located on the base end side of the hollow portion 8 in the axial direction to a distal endmost position P3 located on the distal end side of the hollow portion 8 in the axial direction. The cylindrical surface 10 has a relatively short axial length L1. The cylindrical surface 10 extends axially from the distal endmost position P3 of the tapered surface 9 to a distal endmost position P4 of the hollow portion 8 (which is also the distal endmost position of the pump gear 1).

The tooth portion 11 forms a gear tooth of the pump gear 1 and is provided on the entire circumference in the circumferential direction. The tooth portion 11 extends axially from the base endmost position P2 located on the distal end side of the hollow portion 8 in the axial direction to the distal endmost position P4 described above. An axial length L2 (distance from P2 to P4) of the tooth portion 11 is longer than the axial length L1 (distance from P3 to P4) of the cylindrical surface 10. Therefore, a full length portion of the cylindrical surface 10 and a part of the tapered surface 9 on the distal end side in the axial direction are located radially inside the tooth portion 11. Although the tooth portion 11 forms a helical gear in this embodiment, other types of gears such as spur gears may be formed.

The outer shape of the pump gear 1 is also substantially tapered to match the shape of the inner peripheral surface of the hollow portion 8. Another cylindrical surface 12 adjacent to the base end side of the tapered surface 9 in the axial direction is also formed on the inner peripheral surface of the hollow portion 8.

Here, the tapered surface 9 is configured such that a focusing point F1 of a sound radiation S1 radiating perpendicularly from the distal end portion in the axial direction 15 of the tapered surface 9 is positioned at the distal endmost position P4 in the axial direction of the hollow portion 8 or at a position closer to the base end side in the axial direction than the distal endmost position in the axial direction. In the present embodiment, as shown in the drawing, the tapered surface 9 is formed such that the focusing point F1 of the sound radiation S1 is located at a position closer to the base end side in the axial direction than the distal endmost position P4. The position of the tapered surface 9 and the inclination angle θ are set such that the focusing point F1 is located at such a position.

In other words, the tapered surface 9 is formed such that the focusing point of the sound radiation radiated perpendicularly from all positions (or any position) of the tapered surface 9 is located at the distal endmost position P4 or a position closer to the base end side in the axial direction than that.

Next, the action and effect of this embodiment will be described.

When the pump gear 1 is rotationally driven by the gear 4, the driving force from the gear 4 is transmitted to the tooth portion 11, and the vibration generated in the tooth portion 11 at this time is transmitted through the flesh of the pump gear 1 and reaches the tapered surface 9 and the cylindrical surface 10.

The vibration that reaches the tapered surface 9 vibrates the tapered surface 9, and radiates the sound radiation S1 from the tapered surface 9 in the perpendicular direction toward the inside of the hollow portion 8. The sound radiation radiated from the entire circumference at the same position in the axial direction of the tapered surface 9 is focused on the focusing point F1 (or focus) which is one point on the gear axis C. At this focusing point F1, the noise tends to increase as compared with other positions. The axial position of the focusing point F1 changes according to the axial position of a starting point K1 of the sound radiation S1, and when the latter moves to the base end side, the former also follows and moves to the base end side, and when the latter moves to the distal end side, the former also follows and moves to the distal end side.

Figure 2:
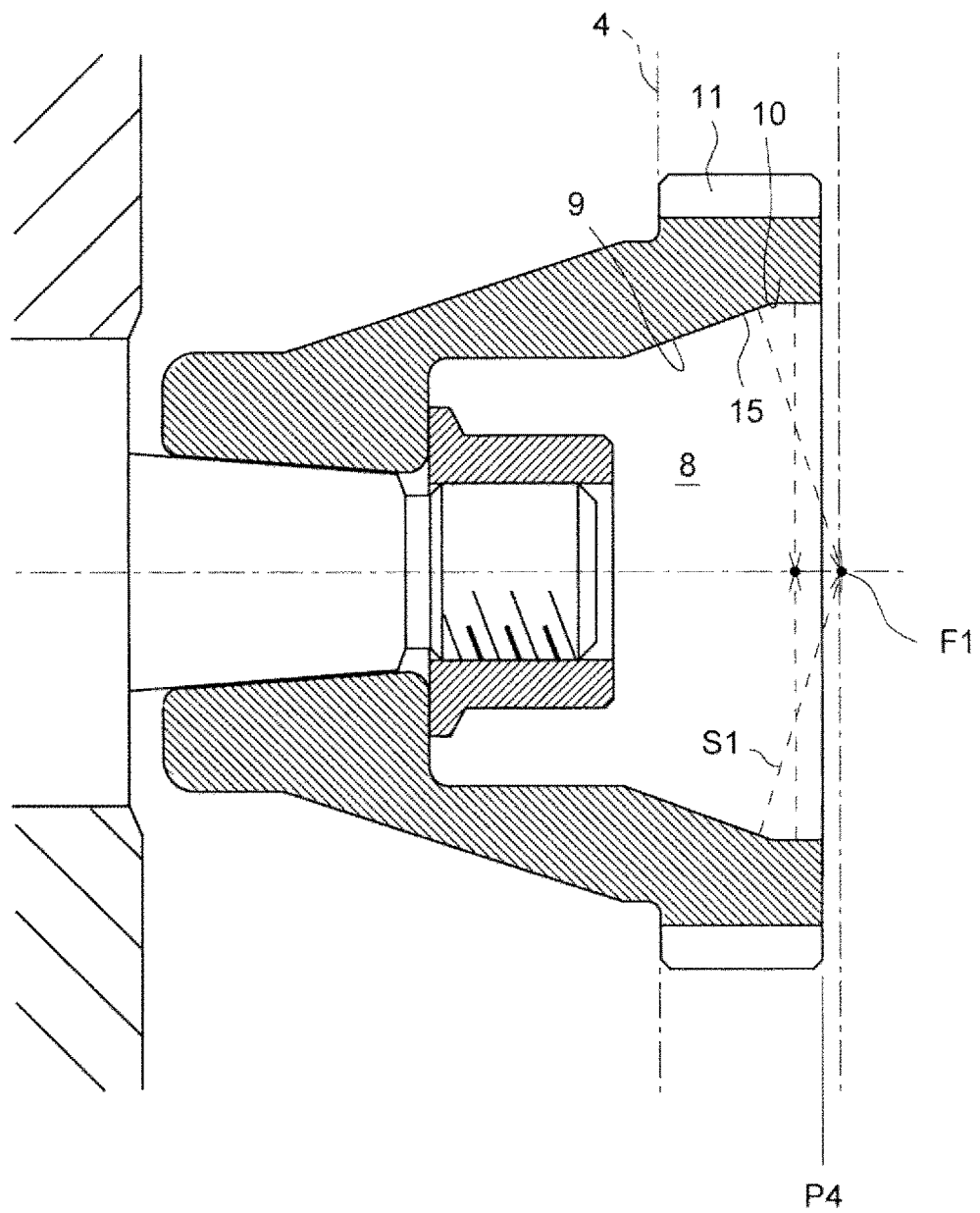
FIG. 2 is a schematic longitudinal sectional view showing a pump gear according to a comparative example.

As shown in FIG. 2, in the comparative example different from the present embodiment, since the tapered surface 9 is not formed as described above, the focusing point F1 of the sound radiation S1 from the distal end portion in the axial direction 15 of the tapered surface 9 is located at the distal end side in the axial direction that is farther than the distal endmost position P4, and the focusing point F1 protrudes from the hollow portion 8. As a result, the focusing point F1 that affects the magnitude of noise is located outside the hollow portion 8, and the noise heard from the outside is increased.

On the other hand, according to the present embodiment, as shown in FIG. 1, the tapered surface 9 is formed such that the focusing point F1 of the sound radiation S1 from the distal end portion in the axial direction 15 of the tapered surface 9 is located at a position closer to the base end side in the axial direction than the distal endmost position P4. Therefore, the focusing point F1 can be located within the hollow portion 8, and also the focusing point F1 can be prevented from protruding from the hollow portion 8, and the focusing point F1 can be prevented from being located outside the hollow portion 8. As a result, it is possible to reduce the noise heard from the outside when the pump gear is driven.

In particular, as the position of the starting point K1 of the sound radiation S1 is closer to the distal end side in the axial direction, it is more likely that the position of the focusing point F1 corresponding to the sound radiation S1 is closer to the distal end side in the axial direction and protrudes from the hollow portion 8. In the present embodiment, since the focusing point F1 of the sound radiation S1 from the distal end portion in the axial direction 15 of the tapered surface 9 including the distal endmost position P3 of the tapered surface 9 does not protrude to the outside of the hollow portion 8, it is possible to reliably reduce noise.

In addition, since the focusing point F1 of the sound radiation S1 from the distal end portion in the axial direction 15 of the tapered surface 9 does not protrude from the hollow portion 8, naturally, the focusing point F1 of the sound radiation S1 from the tapered surface 9 located at a position closer the base end side in the axial direction than the distal end portion in the axial direction 15 can also be prevented from protruding from the hollow portion 8. Therefore, it is possible to prevent the focusing point F1 of the sound radiation S1 from all the positions of the tapered surface 9 from protruding from the hollow portion 8 and to reliably reduce the noise.

In addition, since the sound radiation S2 radiated perpendicularly from the cylindrical surface 10 only moves inward in the radial direction from the cylindrical surface 10, naturally, the focusing point F2 is also located at the distal endmost position P4 or a position closer to the base end side in the axial direction than that. Therefore, the focusing point F2 does not protrude from the hollow portion 8, and noise caused by the sound radiation S2 can be prevented.

According to the present embodiment, the distal end portion in the axial direction 15 of the tapered surface 9 is located radially inside in the axial length range L2 of the tooth portion 11. Therefore, a distance from the tooth portion 11 to the distal end portion in the axial direction 15 is short, and the vibration from the tooth portion 11 is easily transmitted to the distal end portion in the axial direction 15. Therefore, the sound radiation S1 from the distal end portion in the axial direction 15 tends to be large. However, according to the present embodiment, since the focusing point F1 of the sound radiation S1 from the distal end portion in the axial direction 15 does not protrude from the hollow portion 8, it is possible to effectively reduce noise.

According to the present embodiment, since the focusing points F1 and F2 of the sound radiations S1 and S2 from all the positions of the tapered surface 9 and the cylindrical surface 10 are not protruded from the hollow portion 8, as a result, it is possible to prevent the focusing points of the sound radiations from all the positions on the inner peripheral surface of the hollow portion 8 from protruding from the hollow portion 8.

Although the embodiment of the present disclosure has been described in detail above, other embodiments of the present disclosure are also possible.

(1) For example, the engine may be an in-cylinder injection type gasoline engine, and the pump gear according to the present disclosure may be applied to the supply pump thereof.

(2) The cylindrical surface 10 may be replaced with a tapered surface that is opposite to the tapered surface 9. In this case as well, the focusing point of the sound radiation from the opposite tapered surface can be held in the hollow portion.

The embodiment of the present disclosure is not limited to the embodiment described above, and all modifications, applications, and equivalents included in the ideas of the present disclosure defined by the scope of claims are included in the present disclosure. Therefore, the present disclosure should not be construed in a limited manner and can be applied to any other technique belonging within the scope of the ideas of the present disclosure.

This application is based on Japanese Patent Application filed on Sep. 7, 2018 (Japanese Patent Application No. 2018-167882), the contents of which are incorporated herein by reference.

INDUSTRIAL APPLICABILITY

According to the present disclosure, it is useful in that a pump gear capable of reducing noise when the pump gear is driving can be provided.

REFERENCE SIGNS LIST

1: pump gear
2: supply pump
3: input shaft
8: hollow portion
9: tapered surface
15: distal end portion in the axial direction
C: gear axis
S1: sound radiation
F1: focusing point
P4: distal endmost position

The invention claimed is:

1. A pump gear configured to be mounted on an input shaft of a supply pump that pumps fuel, comprising:
   a hollow portion that is open to a distal end side in an axial direction; and
   a tapered surface that is formed on an inner peripheral surface of the hollow portion and gradually increases in diameter as it extends from a base end side toward the distal end side in the axial direction, wherein
   the tapered surface is formed so that a focusing point of sound radiating perpendicularly from a distal end portion in the axial direction of the tapered surface is positioned at a distal endmost position in the axial direction of the hollow portion or at a position closer to the base end side in the axial direction than the distal endmost position in the axial direction.

2. The pump gear according to claim 1, further comprising:
   a cylindrical surface that is formed on the inner peripheral surface of the hollow portion, adjacent to the distal end side of the tapered surface in the axial direction, and formed parallel to the axial direction.

3. The pump gear according to claim 2, further comprising:
   a tooth portion that is formed on an outer peripheral portion of the distal end portion in the axial direction, wherein
   the distal end portion in the axial direction of the tapered surface is located radially inside in an axial length range of the tooth portion.

4. The pump gear according to claim 1, further comprising:
   a tooth portion that is formed on an outer peripheral portion of the distal end portion in the axial direction, wherein
   the distal end portion in the axial direction of the tapered surface is located radially inside in an axial length range of the tooth portion.

* * * * *